United States Patent
Ronayne

(10) Patent No.: US 8,896,613 B2
(45) Date of Patent: Nov. 25, 2014

(54) STORED VALUE DIGITAL PICTURE FRAME

(75) Inventor: Robin Ronayne, Rosemount, MN (US)

(73) Assignee: BBY Solutions, Inc., Richfield, MN (US)

( * ) Notice: Subject to any disclaimer, the term of this patent is extended or adjusted under 35 U.S.C. 154(b) by 165 days.

(21) Appl. No.: 13/271,292

(22) Filed: Oct. 12, 2011

(65) Prior Publication Data

US 2012/0262468 A1   Oct. 18, 2012

Related U.S. Application Data

(60) Provisional application No. 61/406,694, filed on Oct. 26, 2010.

(51) Int. Cl.
 *G09G 5/393* (2006.01)
 *G09G 5/36* (2006.01)
 *G06F 3/147* (2006.01)

(52) U.S. Cl.
 CPC .............. *G09G 5/36* (2013.01); *G09G 2380/16* (2013.01); *G06F 3/147* (2013.01)
 USPC ........................................................ 345/548

(58) Field of Classification Search
 None
 See application file for complete search history.

(56) References Cited

U.S. PATENT DOCUMENTS

| | | |
|---|---|---|
| 7,004,398 B1 | 2/2006 | Francis |
| 7,055,740 B1 | 6/2006 | Schultz |
| 7,198,196 B2 | 4/2007 | Halbur |
| 7,234,639 B2 | 6/2007 | Schultz |
| 7,252,225 B2 | 8/2007 | Schultz |
| 7,264,155 B2 | 9/2007 | Halbur |
| 7,290,713 B2 | 11/2007 | Dean |
| 7,290,714 B2 | 11/2007 | Halbur |
| 7,293,701 B2 | 11/2007 | Halbur |
| 7,314,179 B1 | 1/2008 | Halbur |
| 7,316,357 B2 | 1/2008 | Lindahl |
| 7,322,519 B2 | 1/2008 | Blank |
| 7,360,710 B2 | 4/2008 | Lindahl |
| 7,376,564 B2 | 5/2008 | Selg |
| 7,380,663 B2 | 6/2008 | Bingham |
| 7,409,788 B2 | 8/2008 | Lauer |
| 7,434,735 B2 | 10/2008 | Dean |
| 7,438,224 B1 | 10/2008 | Jensen |
| 7,584,558 B2 | 9/2009 | Boyd |
| 7,591,418 B2 | 9/2009 | Halbur |
| 7,591,431 B2 | 9/2009 | Lindahl |

(Continued)

OTHER PUBLICATIONS

Dec. 3, 2012 USPTO Office Action (U.S. Appl. No. 12/953,526)—Our Matter 4580.

(Continued)

*Primary Examiner* — David Zarka
*Assistant Examiner* — Khoa Vu
(74) *Attorney, Agent, or Firm* — Beck & Tysver PLLC

(57) ABSTRACT

The present invention is a stored value digital picture (or digital image) frame, and a method for sensing a stored value digital picture frame. It integrates the functionality of a stored value card, or a gift card, into a digital picture frame. The stored value digital picture frame may include an attachment device for attaching the frame to a keychain or keyring. The method includes sensing an account identifier from an account identifying device included in the frame, associating the identifier with an account, and taking some action involving the account. The action might be reading the account balance, initializing the balance with an amount, increasing the balance, or decreasing the balance.

17 Claims, 3 Drawing Sheets

(56) References Cited

U.S. PATENT DOCUMENTS

| Patent No. | Date | Inventor | Ref. |
|---|---|---|---|
| 7,628,336 B2 | 12/2009 | Reynolds | |
| 7,641,112 B2 | 1/2010 | Jensen | |
| 7,661,588 B2 | 2/2010 | Porvaznik | |
| 7,677,458 B2 | 3/2010 | Lindahl | |
| 7,717,335 B2 | 5/2010 | Halbur | |
| 7,717,347 B2 | 5/2010 | Boyd | |
| 7,743,982 B2 | 6/2010 | Reynolds | |
| 7,748,607 B2 | 7/2010 | Borkowski | |
| 7,766,222 B2 | 8/2010 | Halbur | |
| 7,766,227 B2 | 8/2010 | Reynolds | |
| 7,770,802 B2 | 8/2010 | Dean | |
| 7,784,686 B2 | 8/2010 | Halbur | |
| 7,789,297 B2 | 9/2010 | Birkeland | |
| 7,810,710 B2 | 10/2010 | Halbur | |
| 7,810,711 B2 | 10/2010 | Halbur | |
| 7,810,719 B2 | 10/2010 | Clegg | |
| 7,810,736 B2 | 10/2010 | Smith | |
| 7,815,108 B2 | 10/2010 | Schacherer | |
| 7,841,538 B2 | 11/2010 | Robertson | |
| 7,861,926 B2 | 1/2011 | Sheldon | |
| 7,866,550 B2 | 1/2011 | Clegg | |
| 7,871,013 B2 | 1/2011 | Schumann | |
| 7,883,004 B2 | 2/2011 | Halbur | |
| 7,891,122 B2 | 2/2011 | Lauer | |
| 7,900,827 B2 | 3/2011 | Albers | |
| 7,905,416 B2 | 3/2011 | Halbur | |
| 7,918,391 B2 | 4/2011 | Clegg | |
| 7,959,068 B2 | 6/2011 | Halbur | |
| 7,980,475 B2 | 7/2011 | Halbur | |
| 8,016,193 B2 | 9/2011 | Haugen | |
| 8,019,451 B2 | 9/2011 | Smith | |
| 8,091,781 B2 | 1/2012 | Albrecht | |
| 8,427,538 B2 | 4/2013 | Ahiska | |
| 8,668,147 B2 | 3/2014 | Jackson | |
| 2005/0012758 A1* | 1/2005 | Christou | 345/619 |
| 2006/0170669 A1* | 8/2006 | Walker et al. | 345/418 |
| 2006/0273153 A1* | 12/2006 | Ashby et al. | 235/380 |
| 2008/0065492 A1 | 3/2008 | Halbur | |
| 2008/0109350 A1 | 5/2008 | Lazarowicz | |
| 2008/0197202 A1 | 8/2008 | Selg | |
| 2009/0099674 A1 | 4/2009 | Smith | |
| 2009/0112711 A1 | 4/2009 | Clegg | |
| 2009/0159691 A1 | 6/2009 | Halbur | |
| 2009/0160874 A1* | 6/2009 | Su | 345/660 |
| 2009/0294528 A1 | 12/2009 | Halbur | |
| 2009/0308920 A1 | 12/2009 | Holt | |
| 2010/0051705 A1 | 3/2010 | Albers | |
| 2010/0108757 A1 | 5/2010 | Clegg | |
| 2010/0110274 A1 | 5/2010 | Reynolds | |
| 2010/0155490 A1 | 6/2010 | Halbur | |
| 2010/0164836 A1* | 7/2010 | Liberatore | 345/1.1 |
| 2010/0170946 A1 | 7/2010 | Lindahl | |
| 2010/0288836 A1 | 11/2010 | Dean | |
| 2010/0325037 A1 | 12/2010 | Halbur | |
| 2010/0325038 A1 | 12/2010 | Albers | |
| 2011/0021106 A1 | 1/2011 | Halbur | |
| 2011/0024498 A1 | 2/2011 | Schacherer | |
| 2011/0024508 A1 | 2/2011 | Halbur | |
| 2011/0025597 A1* | 2/2011 | Lee | 345/156 |
| 2011/0099106 A1 | 4/2011 | Schumann | |
| 2011/0099129 A1 | 4/2011 | Lauer | |
| 2011/0101089 A1 | 5/2011 | Albrecht | |
| 2011/0101090 A1 | 5/2011 | Halbur | |
| 2011/0101611 A1 | 5/2011 | Pompei | |
| 2011/0106697 A1 | 5/2011 | Roberts | |
| 2011/0106699 A1 | 5/2011 | Clegg | |
| 2011/0161187 A1 | 6/2011 | Albrecht | |
| 2011/0174876 A1 | 7/2011 | Clegg | |
| 2012/0266077 A1* | 10/2012 | O'Keefe et al. | 715/739 |

OTHER PUBLICATIONS

Mar. 13, 2013 USPTO Office Action (U.S. Appl. No. 13/043,589)—Our Matter 4509.

Jul. 24, 2013 USPTO Office Action (U.S. Appl. No. 13/043,589)—Our Matter 4509.

* cited by examiner

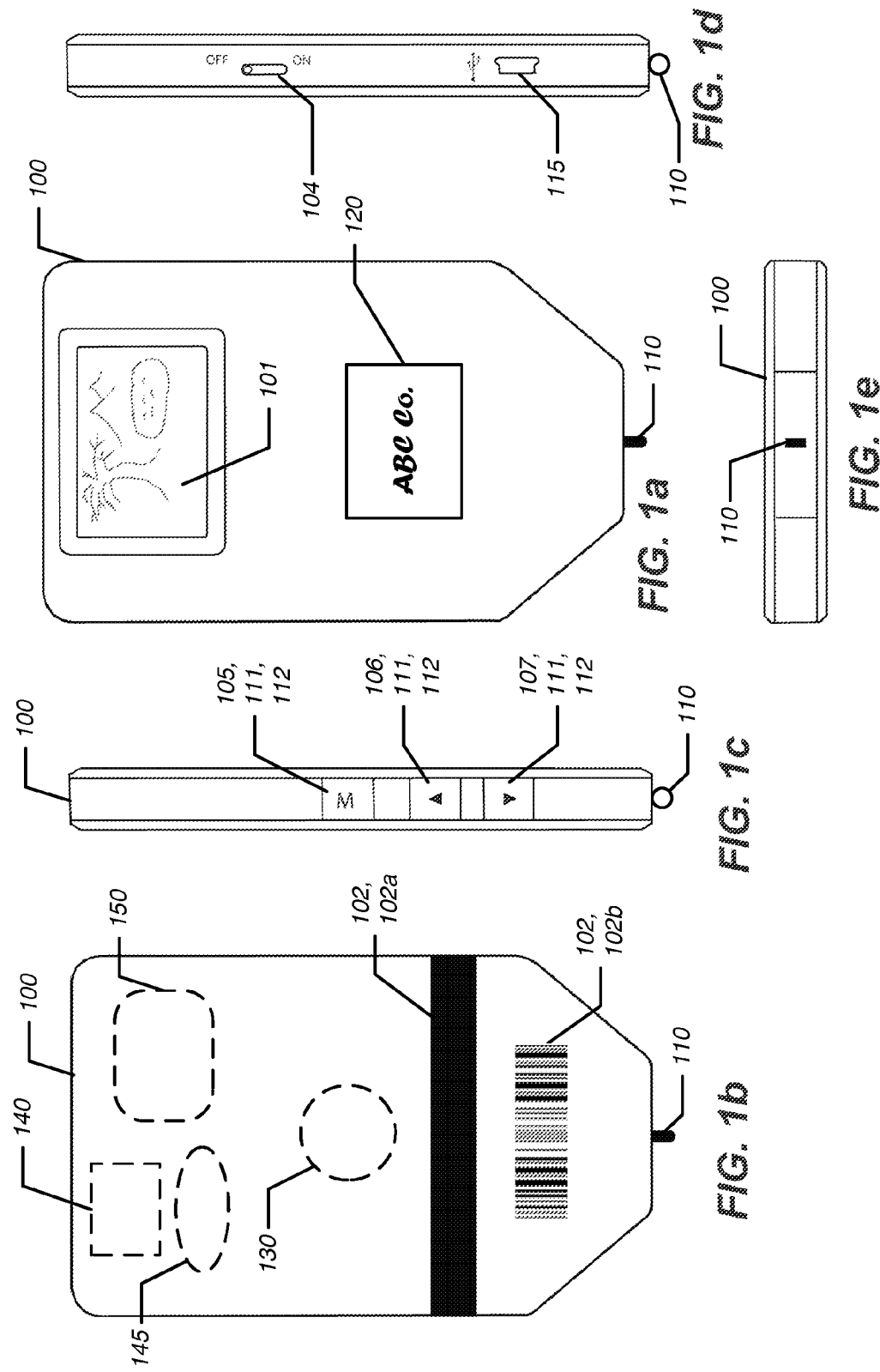

STORED VALUE DIGITAL PICTURE FRAME

CROSS REFERENCE TO RELATED APPLICATION

This application claims the benefit of U.S. Provisional Application No. 61/406,694, filed Oct. 26, 2010, which is hereby incorporated by reference in its entirety.

FIELD OF THE INVENTION

The present invention relates to stored value media. More specifically, it relates to a stored value digital picture frame.

BACKGROUND OF THE INVENTION

A stored value card is a card that represents some kind of value, typically financial value. For example, a stored value card might be redeemable at a particular store for a certain monetary value in merchandise or services. A stored value card might be simply represent an amount of cash, that can be used, for example, as a substitute for a credit or debit card in making any kind of purchase, or to pay off debt. A stored value card might be restricted to a particular set of products or services; for example, it might represent ten deluxe car washes at some gas station. A gift card is a particular kind of stored value card, one purchased by a donor as a gift for, e.g., a friend, relative, or employee.

A stored value card must typically be activated, before it can be used to spend a portion of its stored value. This requirement protects the card retailer by reducing both the likelihood and the consequences of theft while the cards are displayed in a store. The card is activated by an initial scanning at the point of sale at the time when it is purchased, and, at the same time, an initial amount is associated with the card.

The amount initially added gives the stored value card an initial value balance. The value represented by the card is reduced when the card is used to make a purchase. Additional value for the card can typically be purchased from the card issuer or a card seller. In the case of a gift card, the donee or the donor might be able to buy additional stored value.

The balance of value remaining on the stored value card may be stored as an account in an electronic recordkeeping system, or database. In this case, the card must contain a device that provides identifying information for the account, such as a bar or UPC code, a magnetic strip, a radio frequency identification (RFID) tag, a smart chip, or other identifying device. In the case of a card with a smart chip or similar device, the stored value balance may be maintained within the card itself. When a stored value card is redeemed, for example to make a purchase, then the account balance is reduced by the purchase amount. At a retail establishment, the account balance is usually automatically adjusted at the point of sale by the action of scanning the card, or manually by salesperson data entry.

A digital picture frame is a device, which resembles an ordinary picture frame, but which is actually an electronic device that displays digital images, such as photographs, on a screen or monitor. Since what is displayed might be any kind of images (e.g., a sequence of computer-aided design drawings), the term "digital image frame" is more general. In keeping with common practice, however, we will treat the terms "digital picture frame" and "digital frame" as being synonymous with "digital image frame."

The screen of a digital picture frame may employ any of the technologies used for digital displays, such as liquid crystal display (LCD), organic light emitting diode (OLED), or cathode ray tube (CRT) technology. The digital picture frame provides internal storage for the images, typically in flash memory or on a hard drive. The frame will provide one or more communications methods for loading photographs into the storage, such as a USB port (standard, mini, or micro), or BLUETOOTH® or other wireless technology. The unit might also allow images to be offloaded to an external device using such communication system(s).

The frame will have a power source, such as a battery or AC power cord. If a battery is used, then a user may have access to the battery to allow the battery to be replaced. Alternatively, the battery might be rechargeable by connecting the unit to a charger, for example through a USB, mini-USB, or micro-USB port. The frame may have an on/off switch, or it be powered on by touch. For example, there might be pressure sensors on opposite sides of the unit, such that the unit is turned on or off while it is being held in a person's hand. Alternatively, when the unit is held, a circuit might be closed, allowing a weak electrical current to flow through the user's hand, thereby turning the device on. Once the device is turned on by such an automated means, there might be a delay before the device is turned off, to allow the device to be handed from one user to another without shutting down. The frame may shut itself down if no user contact with controls has occurred for some previously specified period. The frame may have an intermediate power state in which it is still powered on but the screen is dimmed or blank pending user interaction with a control.

The frame will be capable of running in one or more modes, such as a slide show mode or a static picture mode. A set of controls may be provided that allow the user to select a mode, and to otherwise specify desired behavior of the frame. Frames often provide the user with some or all of the following capabilities: (1) when in static picture mode, to go forward or backward one picture in the sequence of pictures; (2) to cycle through all or some subset of the pictures automatically; (3) when cycling, to set the time interval that each picture is displayed; (4) to specify how one picture in the sequence transitions into display of the next, for example, one picture fades out and the next fades in; (5) to delete pictures; (6) to arrange the pictures in a display order; and (7) to set the screen brightness. Other features may also be under user control. The controls may be physical controls, such as buttons, sliders, or dials. These controls may be located anywhere on the frame itself, or on a wired or wireless remote control unit, or both. Some or all controls may be part of a graphical user interface, such as a touch screen. The frame might use a human interface device such as a mouse, a keyboard, or a joystick to enter commands.

The functionality of the frame may be managed internally by a processor, under control of an operating system and application logic, the logic embodied in some combination of hardware and software instructions. The processor may have access to memory, and/or storage such as flash memory or a hard drive, including tangible storage that includes the software instructions. The processor may read software into memory to execute it. Any aspect of functionality of the frame might be managed by the logic. For example, the logic, upon a receipt of a previously specified signal, might cause a digital image, which is stored in image storage, to be displayed on the screen. This signal might be triggered by a user selection from a menu, or by a button press; or it might be triggered automatically by the logic itself, for example when cycling through a slide show or sequence of images.

Digital frames come in many sizes, and with a broad diversity in capabilities Small digital frames have been combined with key chains and key rings.

SUMMARY OF THE INVENTION

A gift of money or a gift card is regarded by some as rather impersonal gift, in comparison to a gift of something more tangible that takes into account a desire, need, or taste of the particular recipient. On the other hand, it is often the case that even a close relative is difficult to buy for. The inventor realized that a gift card might be personalized if it were combined with photographs that were meaningful to the recipient, and that combination might be achieved by incorporating the gift card concept into a digital picture frame. We will refer to this concept as a "stored value digital picture frame" or, simply, a "stored value frame," or "frame." Of course, the stored value frame is a more general concept than a gift stored value frame, just as a stored value card is a more general concept than a gift card.

In general, a stored value frame can have all the capabilities of a stored value card and those of a digital picture frame, such as those already described. Like a stored value card, a stored value frame will include some kind of account identifier, such as a magnetic strip or a bar code. This might be wholly or partially on the surface of the frame, or inside. A stored value digital frame will have functionality, user controls, a power source, and an internal processing system, like a digital picture frame as described above in the Background section.

In principle, like any digital frame generally, a stored value frame might come in any size and shape. The invention encompasses all such embodiments. However, a small digital frame, such as one that includes, or attaches to, a key ring would be convenient for the recipient to carry in their pocket. It would also be convenient for the recipient, or a sales attendant, to swipe across a scanner to activate the stored value frame, or to update the account balance when the frame is used to make a purchase.

A logo or contact information on a stored value frame could be a useful advertising tool. Such a frame could be given to employees, with a bonus in the stored value. A firm wishing to market itself could send a stored value frame to prospective clients. A retailer could give a reward to loyal customers in a stored value frame, or use a stored value frame as incentive for customers to make a particular purchase, or simply to attract customers to a store. Because a person would probably have a digital frame that is loaded with photographs that are personally meaningful, they might be motivated to carry the stored value frame, displaying the company marketing information, with them.

Embodiments of the invention include a method, comprising the steps of: during a transaction, sensing electronically an account identifier affixed in an account identifier device to a stored value digital frame; using a computer system, associating the account identifier with information, stored in tangible electronic storage, regarding an account; and reading a stored value balance of the account, or, in an amount corresponding to the transaction, initializing, raising, or lowering the stored value balance.

BRIEF DESCRIPTION OF THE DRAWINGS

FIG. 1a is a top view of a first configuration of a stored value frame.

FIG. 1b is a bottom view of a first configuration of a stored value frame.

FIG. 1c is a left side view of a first configuration of a stored value frame.

FIG. 1d is a right view of a first configuration of a stored value frame.

FIG. 1e is a front view of a first configuration of a stored value frame.

DETAILED DESCRIPTION OF EXEMPLARY EMBODIMENTS

Figure 3:
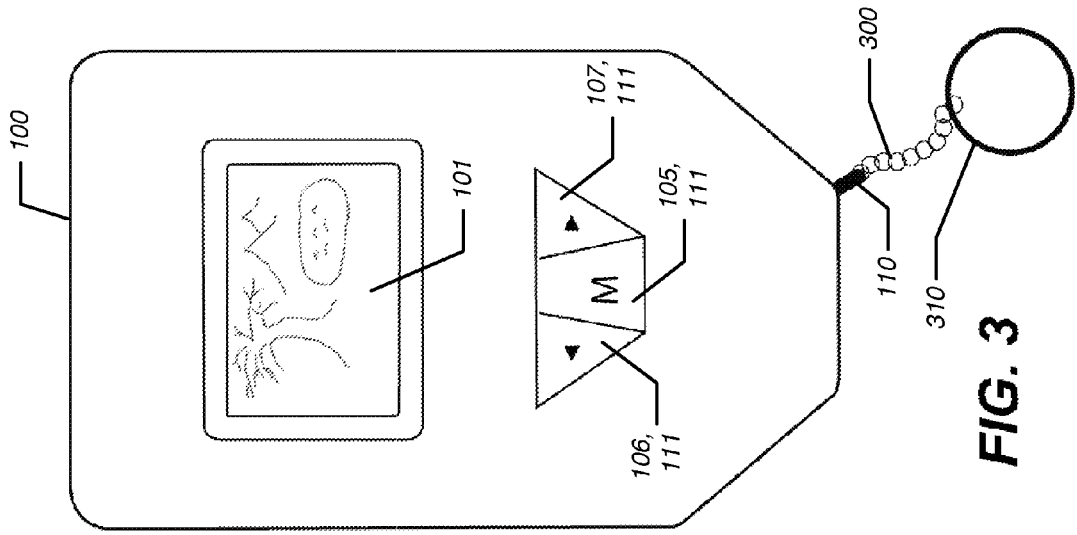
FIG. 3 is a top view of a third configuration of a stored value frame.

Illustrative embodiments of the invention are described by the drawings and the accompanying text below. A person having skill in the art will recognize that many other embodiments and variations are possible within the scope of the invention that integrate the functionality of a stored value or other financial transaction card into a digital picture frame.

FIGS. 1a-1e are top, bottom, left, right, and front views, respectively, of an embodiment of a stored value digital frame 100. The stored value frame 100 has a screen 101 or monitor that displays digital photographs or other digital images stored in the device. This screen or monitor could use any display technology, such as LCD or OLED. The screen might display images in two dimensions (2D) or three dimensions (3D). The frame 100 will support one or more formats for images, such as 2D images in JPEG, GIF, or TIFF format, or any 3D image formats.

An account ID device 102 associates the stored value frame 100 with a particular account identifier, which identifies a unique account. Account information may be maintained in an account maintenance system. The role of the account maintenance system might be might be performed by the stored value frame 100 itself, through a smart chip or an internal processing system. Or the account maintenance system might be a processing system—by a "processing system" we mean one or more devices having processors, such as computers, possibly communicating by one or more networks, and utilizing one or more storage devices and peripheral devices, possibly under the management of one or more persons or entities, and controlled by various logical units such as hardware and software programs. The storage information system might store the account information in a database, file, or any other information storage representations.

The account ID device 102 allows the frame 100 to be scanned, the scanning accomplishing several purposes. An initial scan at the point of sale (POS) of the frame 100 may establish an initial balance. A particular frame 100 might have a fixed initial balance, or the user might be free to specify and purchase an initial balance, which might be entered by a salesperson at POS into the account maintenance system. The initial scan might also activate the account, so that the account maintenance system will allow future purchases of goods or services or other expenditures to be made against the stored value. The initial scan might also update inventory data pertaining to this or similar stored value frames 100, and update transactional data pertaining to the purchase and activation. Subsequent scans can be used to reduce the stored value to make purchases or expenditures. In some embodiments, additional stored value can purchased, which typically would also involve scanning the frame 100.

In the embodiment shown, two types of account ID device 102 are shown, namely, a magnetic strip 102a and a bar code 102b. Having account ID devices 102 of a plurality of types may have the advantage of making the stored value frame 100 capable of being scanned by more sensor types or POS systems.

The embodiment contains an power switch 104 that determines whether the electronics of the frame 100 are activated, in other words, whether a user can display pictures and operate controls 111. In other embodiments, the frame 100 might simply be constantly on; or it might be turned on/off by touch, such as by pressure or electrical sensors; or it might be turned on/off by a voice sensor or other kind of sensor of pressure, electrical, or electromagnetic changes. Once the frame 100 is on, especially if by automated means, there might be a previously specified minimal amount of time after last user touch before the frame 100 turns itself off. Such a delay before the frame 100 is turned off might allow the frame 100 to be handed from one user to another without shutting down. The frame 100 may shut itself down if no user contact with controls has occurred for some previously specified period. The frame may have an intermediate power state in which it is still powered on but the screen is dimmed or blank pending user interaction with a control. Generally, any arrangement of power management is within the scope of the invention.

The frame 100 has a power source that provides electricity to the electronics. In the embodiment shown, a battery 130 provides power to the frame 100. The battery 130 and other internal components are shown dashed in FIG. 1b. The battery 130 (or batteries) may be of any kind. In some embodiments, there might be a user access mechanism to allow the user to replace a non-rechargeable battery 130 or to externally recharge a rechargeable battery 130. Preferably, however, the battery 130 will be rechargeable; in this case, the user might not be provided with access to the battery 130. Preferably, a port will be provided through which power can be provided to recharge the battery. In the embodiment shown, the USB port 115 might be used to provide power to recharge the battery 130, and/or to power the frame 100 from an external source such as a notebook computer, an AC power source, or a car charger. A USB port 115 for this purpose might be standard, mini- (as shown in the figure), or micro-sized. Other forms of power supply port are also within the scope of the invention.

The USB port 115 can serve other purposes as well. Digital images can be loaded into storage 150 within the frame 100 through the USB port 115, or offloaded from the frame 100 to an external storage device. The USB port 115 might be used to back up some or all of the images contained in storage on the frame 100, or to initialize or specify frame 100 settings, as an alternative to physical controls on the device (e.g., buttons or touch screen), or to a remote control device. Any other type of communication mechanism, wired or wireless, might be used alternatively or in addition for such purposes.

Much of the functionality of the frame 100 may be managed by a processor 140. Logic for the frame 100 may be in the form of hardware, software instructions, or some combination thereof. Software instructions may be contained in some form of storage 150, such as flash memory or a hard drive. The storage 150 device holding the software instructions may be the same storage 150 that stores the images. Software instructions will typically be loaded by the processor 140 into memory 145 for execution. The processor 140, the memory 145, and the storage 150 will be connected by some kind of communication system, such as a hardware bus.

User management of the functions of the frame 100 may be provided in a number of ways, alone or in any combination. The frame 100 may be equipped with various physical controls 111, such as the buttons shown in FIG. 1c. This embodiment has a menu control 105, a previous item control 106, and a next item control 107. The menu control 105 may give user access to one or more menus that are displayed on the screen. The menus can be used to control the functionality of the frame 100. For example, the menus might control whether the following capabilities: (1) when in static picture mode, to go forward or backward one picture in a sequence of pictures; (2) to cycle through all or some set of the pictures automatically as a slide show; (3) when cycling, to set the time interval that each picture is displayed; (4) to specify how one picture in the sequence transitions into the next, for example, one picture fades out and the next fades in; (5) to delete pictures; (6) to arrange the pictures in a display order; (7) to display characteristics (e.g., size, type, user rating, date last modified) in lists; (8) to group pictures into folders, possibly in a hierarchical file system, or into playlists; (9) to display a thumbnail of a photo; and (10) to set the screen brightness. Other features may also be under user control through the menu system. The previous item control 106 might be used to move to a previous item in a menu. The next item control 107 might be used to move to a next item in a menu. Some embodiments might have an enter control (not show), to select a particular item in a menu. An enter control may not be needed, depending on the functionality of the menu control 105. For example, once inside the menu system, a short press of the menu control 105 might operate to select the currently highlighted item. Holding the menu control 105 for at least some previously specified time interval could exit the menu system. The previous item control 106 and the next item control 107 might also function, when the user is outside the menu system, to changed the image being displayed to the next or previous image, respectively, in a sequence of stored images. Control might also wholly or partially be provided by the display itself, if it has touch screen functionality.

The stored value frame 100 will have a attachment structure. For example, in the embodiment shown, there is an attachment device 110 that can be used to attach the frame 100 to a keychain or a keyring. Preferably the frame will have dimensions small enough that it is convenient to carry on a keyring or keychain, although this is not a requirement. To accommodate this, a frame 100 would preferably fit entirely into a box having dimensions 100 by 80 mm by 15 mm.

In some circumstances, a person or entity might want to give a stored value frame 100 as a form of advertising, for example: as a reward to loyal customers; as a way of increasing awareness of a company's name and contact information to clients or client prospects; or as an incentive to visit a store, or to purchase a particular item. In such cases, the frame 100 might display a company logo or icon, such as the advertisement 120 in FIG. 1a. Other characteristics of the frame 100 might also serve to promote a brand. For example, the frame 100 in FIG. 1a has the general shape of a store tag, and might be colored yellow. The store tag shape and yellow color are in accord with trademarks of BBY Solutions, Inc., calling those trademarked symbols to mind for some observers of the frame 100.

Figure 2:
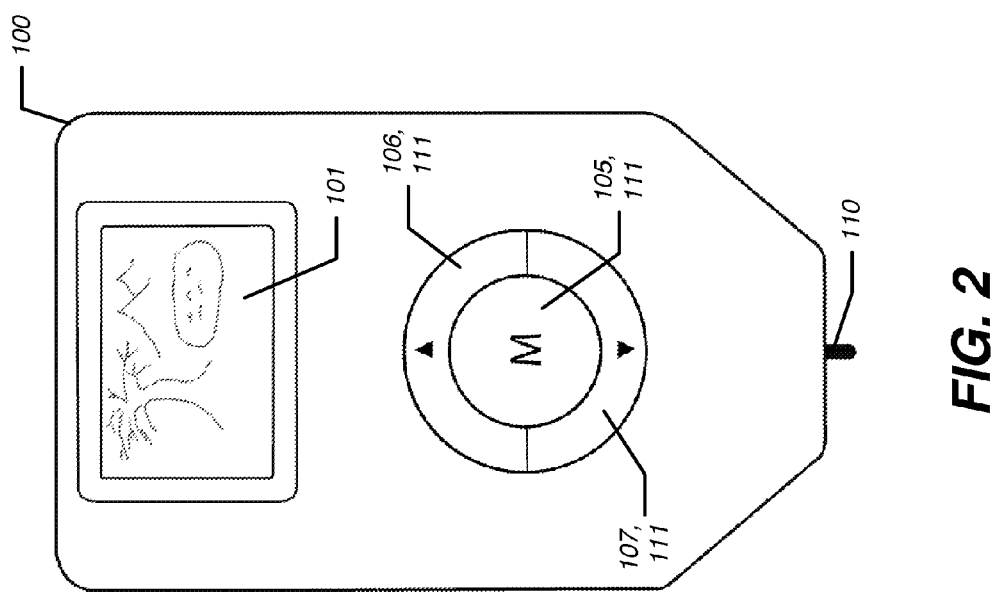
FIG. 2 is a top view of a second configuration of a stored value frame.

FIGS. 2 and 3 illustrate a couple of other possible arrangements and shapes of user controls 111. Some uses of the controls 111 shown have already been described. FIG. 3 also depicts a key ring 200 and key chain 300 attached to an attachment device 110.

Figure 4:
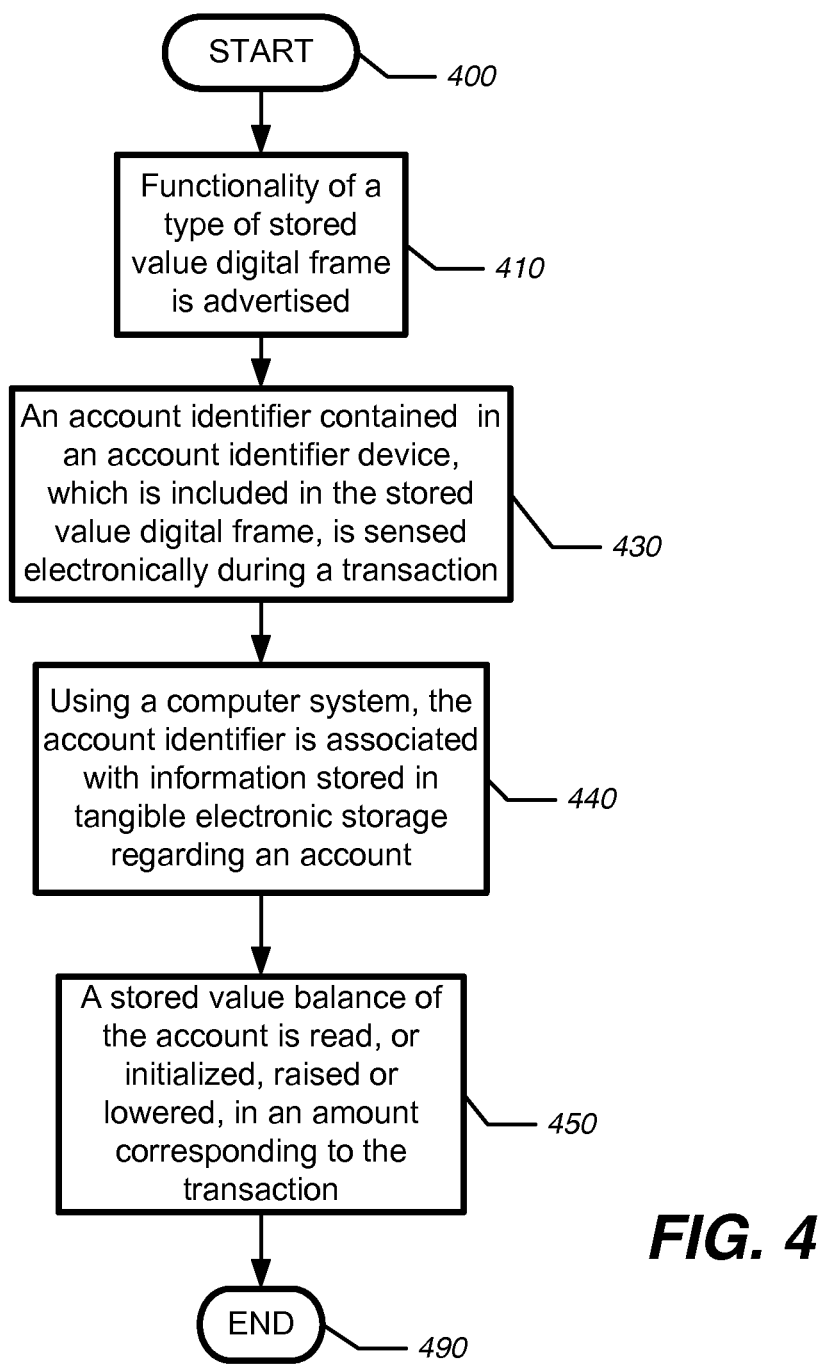
FIG. 4 is a flowchart illustrating an embodiment of the invention.

FIG. 4 is a flowchart illustrating an embodiment of the invention. After the start 400, some functionality of a type of stored value digital frame 100 is advertised 410. The "type" might be, for example, a particular manufacturer, vendor, brand, model, or SKU of frame 100. The functionality might be any feature of the frame 100, such as the combination of a digital picture frame and stored value capability. As described previously, a stored value frame 100 integrates stored value into a digital image/picture frame. The advertising might be by any method employed by a seller of the type of frame 100; for example, a newspaper advertisement; online publication of products and their capabilities; an in-store display of a frame 100 for sale; or a demonstration by a salesperson of a frame 100 to a customer. Note that some embodiments of the methods of the invention do not include this advertising step.

An account identifier contained in an account ID device 102, which is located on the surface of, or wholly or partially inside the stored value digital frame 100, is sensed 430 electronically during a transaction. For example, the transaction might be to read the stored value balance associated with the frame 100; initialization or activation of the stored value in the frame 100; purchase of the frame 100; purchase of goods or services, or payment of debt, using the frame 100; other expenditure of value from the frame 100; increase in the stored value of the frame 100; or any other transaction involving scanning the frame 100. Sensing might involve any kind of equipment, such as a handheld device or a POS scanner. Sensing might use any technology, such as radio frequencies, laser, charge-coupled device (CCD) technology, Contact Image Sensor (CIS) technology, photomultiplier tube technology, photographic scanning, or 3D scanning technology. Sensing might be performed actively by a person, or passively by an automated sensing device such as an RFID sensor. The person might be anyone, such as an employee of a store that is selling the frame 100, applying the frame to a purchase, or adding stored value to the frame 100; it might be a frame 100 purchaser, giver, recipient, or owner. The account ID will usually be a sequence of letters and/or numerals, but it could be any combination of symbols that might uniquely identify an account. The account ID device 102 might be a magnetic strip 102a, a bar code 102b, a smart chip, a RFID tag, or any other type of device from which a sensor might sense or read an account ID. "Electronically" merely implies that some aspect of the sensing involves electricity.

Using a processing system (defined broadly, as described previously), the account identifier is associated 440 with information stored in tangible electronic storage regarding an account. Note that the account may not exist in the storage prior to the transaction. For example, upon activation of a stored value digital frame 100, data regarding the account may be initialized within the storage, but association will be performed nevertheless. A stored value balance of the account is read from storage, initialized, raised, or lowered 450, in an amount corresponding to the transaction. For example, the stored value balance might be initialized at when a donor purchases a stored value frame 100 as a gift and the stored value frame 100 is activated. The stored value balance might be lowered when a recipient of a gift stored value frame 100 uses the stored value frame 100 to make a purchase. The stored value balance might be increased upon activation, if the account already exists in storage with a zero balance. This might also be regarded as initialization of the balance. The stored value balance might also be increased, for example, by a recipient of a gift stored value frame 100 (or by the original giver or anyone else) by a purchase of additional stored value. The process ends 460. In other embodiments, the stored value balance is retrieved from upon sensing.

Of course, many variations of the above embodiments are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A method, comprising:
   a) during a transaction, sensing electronically an account identifier from an account identifier device included in a stored value digital frame;
   b) using a computer system, associating the account identifier with information, stored in tangible electronic storage, regarding an account; and
   c) (i) reading a stored value balance of the account, or (ii) in an amount corresponding to the transaction, initializing, raising, or lowering the stored value balance;
   wherein the stored value digital frame includes:
   (i) an electronic digital picture frame, including a screen,
   (ii) an account identifying device, included in the frame, that associates the frame with a stored value account,
   (iii) tangible digital image storage within the stored value digital frame, of size sufficient to store a plurality of digital images, and
   (iv) logic, embodied in some combination of hardware, and software instructions stored in software storage, that upon a receipt of a previously specified signal, will cause a digital image, which is stored in the image storage, to be displayed on the screen.

2. The method of claim 1, wherein the stored value digital frame further includes:
   (v) a control whereby a user can cause the stored value digital frame to perform a function involving a digital image that is stored in the image storage.

3. The method of claim 1, wherein the stored value digital frame further includes:
   (v) a menu control, a next item control, and a previous item control.

4. The method of claim 1, wherein the stored value digital frame further includes:
   (v) an attachment device, connected to the picture frame, whereby a keychain or key ring can be attached to the picture frame.

5. The method of claim 1, wherein the stored value digital frame further includes:
   (v) a communication port.

6. The method of claim 5, wherein, under control of the logic, the communication port recharges a battery in the stored value digital frame when the communication port is connected to a power source.

7. The method of claim 5, wherein, under control of the logic, the stored value digital frame transfers a digital image into or out of the image storage through the communication port.

8. The method of claim 5, wherein the communication port is a USB port, a mini-USB port, or a micro-USB port.

9. The method of claim 1, wherein the stored value digital frame further includes:
   (v) space on a surface that displays advertising information.

10. The method of claim 9, wherein the advertising information is in accord with a brand trademark.

11. The method of claim 9, wherein the advertising information includes an aspect of shape of the electronic digital picture frame that is in accord with a trademark associated with a brand.

12. The method of claim 9, wherein the advertising information includes an aspect of color of the electronic digital picture frame.

13. The method of claim 1, further comprising:
   d) advertising the capabilities of the type of stored value digital frame.

14. The method of claim 1, wherein the account identifying device is located on an external surface of the picture frame.

15. The method of claim 14, wherein the stored value digital frame further includes:

(v) an attachment device, connected to the frame, whereby a keychain or keyring can be attached to the picture frame, and wherein the electronic digital picture frame will fit in a box having dimensions 100 by 80 mm by 15 mm.

16. The method of claim 15, wherein the stored value digital frame further includes:
   (vi) a keychain or key ring attached to the attachment device.

17. The method of claim 1, wherein the stored value digital frame further includes
   (v) a keychain or key ring attached to the electronic digital picture frame.

* * * * *